United States Patent

Puyenbroek et al.

[11] Patent Number: 5,986,016
[45] Date of Patent: Nov. 16, 1999

[54] POLYETHERIMIDE RESIN COMPOSITIONS HAVING IMPROVED DUCTILITY

[75] Inventors: Robert Puyenbroek, Bergen op Zoom, Netherlands; James Fishburn, Lenox, Mass.

[73] Assignee: General Electric Co., Pittsfield, Mass.

[21] Appl. No.: 08/997,203

[22] Filed: Dec. 23, 1997

[51] Int. Cl.[6] .......................... C08F 283/04; C08G 69/44; C08G 69/48; C08G 73/10
[52] U.S. Cl. ................ 525/420; 525/421; 525/422; 525/430; 525/431; 525/432
[58] Field of Search .................... 525/420, 421, 525/422, 423, 430, 431, 432

[56] References Cited

U.S. PATENT DOCUMENTS

| | | |
|---|---|---|
| 3,169,121 | 2/1965 | Goldberg . |
| 3,189,662 | 6/1965 | Vaughn, Jr. . |
| 3,419,632 | 12/1968 | Sogawa et al. . |
| 3,544,514 | 12/1970 | Schnell et al. . |
| 3,635,895 | 1/1972 | Kramer . |
| 3,803,085 | 4/1974 | Takehoshi et al. . |
| 3,847,867 | 11/1974 | Heath et al. . |
| 3,847,869 | 11/1974 | Williams, III . |
| 3,850,885 | 11/1974 | Takekoshi et al. . |
| 3,852,242 | 12/1974 | White . |
| 3,855,178 | 12/1974 | White et al. . |
| 3,905,942 | 9/1975 | Takekoshi et al. . |
| 3,972,902 | 8/1976 | Heath et al. . |
| 3,983,093 | 9/1976 | Williams, III et al. . |
| 4,001,184 | 1/1977 | Scott . |
| 4,430,484 | 2/1984 | Quinn . |
| 4,455,410 | 6/1984 | Giles, Jr. . |
| 4,487,896 | 12/1984 | Mark et al. . |
| 5,051,483 | 9/1991 | Rock et al. . |
| 5,411,999 | 5/1995 | Gallucci . |
| 5,455,310 | 10/1995 | Hoover et al. . |
| 5,530,083 | 6/1996 | Phelps et al. . |

Primary Examiner—Nathan M. Nutter

[57] ABSTRACT

A thermoplastic resin composition containing a polyetherimide resin; a siloxane-polyetherimide copolymer; one or more resins selected from the group consisting of polycarbonate resins and copolyester-carbonate resins; and one or more component selected from glycidyl ester impact modifiers and siloxane-polycarbonate copolymers exhibits improved ductility and low temperature impact properties.

21 Claims, No Drawings

POLYETHERIMIDE RESIN COMPOSITIONS HAVING IMPROVED DUCTILITY

FIELD OF THE INVENTION

The invention relates to polyetherimide resin compositions that exhibit improved ductility.

BRIEF DESCRIPTION OF THE RELATED ART

Thermoplastic resin blends containing a polyetherimide resin, a siloxane-polyetherimide copolymer, and a minor amount of polycarbonate that exhibit high heat distortion temperature, high impact strength, good solvent resistance and good processability have been disclosed in U.S. Pat. No. 5,051,483.

It is believed that these thermoplastic resin blends would find even wider applicability if their impact strength and ductility at low temperatures could be improved.

SUMMARY OF THE INVENTION

The present invention is directed to thermoplastic resin composition, comprising:

(a) a polyetherimide resin;

(b) a siloxane-polyetherimide copolymer; and (c) one or more resins selected from the group consisting of polycarbonate resins and copolyester-carbonate resins; and (d) one or more components selected from glycidyl ester impact modifiers and siloxane-polycarbonate copolymers, in an amount effective to provide improved low temperature impact properties to the thermoplastic composition.

The thermoplastic resin composition of the present invention exhibits high heat distortion temperature, good room temperature impact performance and improved impact strength and ductility at low temperatures.

DETAILED DESCRIPTION OF THE INVENTION

In a first preferred embodiment, the thermoplastic resin composition of the present invention comprises, based on 100 parts by weight ("pbw") of the thermoplastic resin composition, from 50 to 80 pbw, more preferably from 55 to 75 pbw and still more preferably from 65 to 75 pbw, of the polyetherimide resin; from 0.5 to 12 pbw, more preferably from 2 to 10 pbw and still more preferably from 2 to 8 pbw, of the siloxane-polyetherimide copolymer; from 15 to 35 pbw, more preferably from 20 to 30 pbw and still more preferably from 25 to 30 pbw, of the one or more resins selected from the group consisting of polycarbonate resins and copolyester-carbonate resins; and from 0.5 to 12 pbw, more preferably from 2 to 10 pbw and still more preferably from 2 to 8 pbw, of the one or more components selected from glycidyl ester impact modifiers and siloxane-polycarbonate copolymer.

In a preferred embodiment, component (c) of the composition of the present invention is a polycarbonate resin. In a first highly preferred embodiment, component (c) is polycarbonate resin and component (d) is a glycidyl ester impact modifier. In a second highly preferred embodiment, component (c) is polycarbonate resin and component (d) is a glycidyl ester impact modifier. In a third highly preferred embodiment, component (c) is a polycarbonate resin and component (d) is a glycidyl ester impact modifier and a siloxane-polycarbonate copolymer.

In an alternative preferred embodiment, component (c) of the composition of the present invention is a copolyester-carbonate resin. In a first highly preferred embodiment, component (c) is copolyester-carbonate resin and component (d) is a glycidyl ester impact modifier. In a second highly preferred embodiment, component (c) is a copolyester-carbonate resin and component (d) is a siloxane-polycarbonate copolymer.

Polyetherimide resins suitable for use as the polyetherimide resin component of the thermoplastic resin of the composition of the present invention are known compounds whose preparation and properties have been described, see generally, U.S. Pat. Nos. 3,803,085 and 3,905,942, the respective disclosures of which are incorporated herein by reference.

In a preferred embodiment, the polyetherimide resin component of the present invention contains from greater than 1 to 1000 or more, preferably from 10 to 1000, structural units of the formula (I):

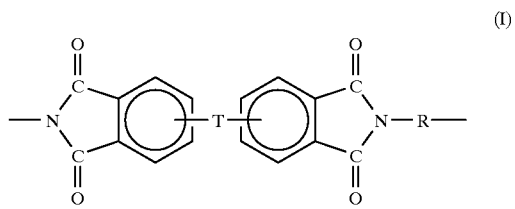

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

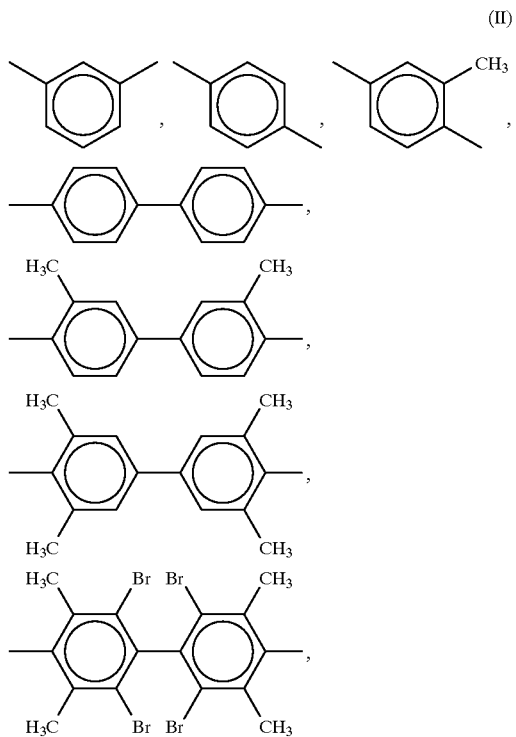

-continued

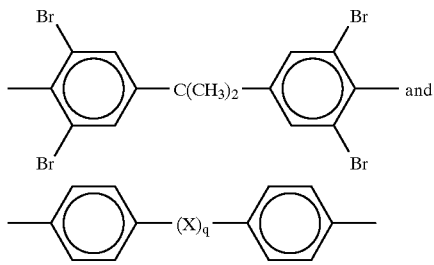
and

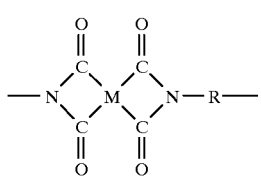

wherein X is a member selected from the group consisting of divalent radicals of the formulae (III):

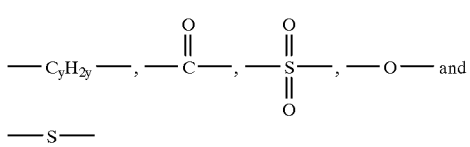
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

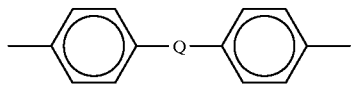
(IV)

where Q is a member selected from the group consisting of formulae (V):

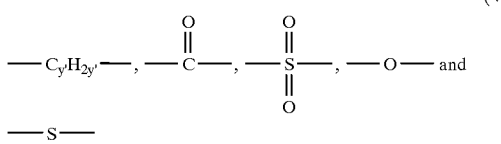
(V)

where y' is an integer from about 1 to about 5.

In one embodiment, the polyetherimide resin may be a copolymer which, in addition to the etherimide units described above, further contains polyimide repeating units of the formula (VI):

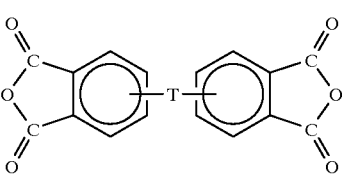
(VI)

wherein R is as previously defined for formula (I) and M is selected from the group consisting of formula (VII):

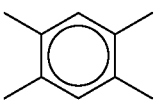
(VII)

formula (VIII):

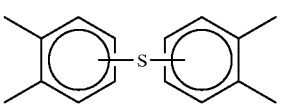
(VIII)

formula (IX):

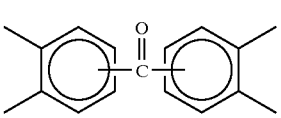
(IX)

Polyetherimide resins are made by known methods, such as, for example, those disclosed in U.S. Pat. Nos. 3,847,867, 3,814,869, 3,850,885, 3,852,242 3,855,178 and 3,983,093, the disclosures of which are hereby incorporated herein by reference.

In a preferred embodiment, the polyetherimide resin is made by the reaction of an aromatic bis(ether anhydride) of the formula (X):

(X)

with an organic diamine of the formula (XI):

$H_2N—R—NH_2$ (XI)

wherein T and R are defined as described above in formula (I). In general the reactions can be carried out employing well-known solvents, e.g., o-dichlorobenzene, m-cresol/toluene and the like to effect interaction between the anhydride of formula (X) and the diamine of formula (XI), at temperatures from about 100° C. to about 250° C. Alternatively, the polyetherimide resin can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride;

4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy) 4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

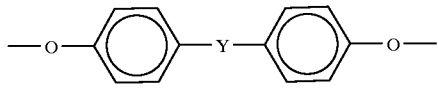

(XII)

wherein each Y is independently selected from the group consisting of: formulae (XIII):

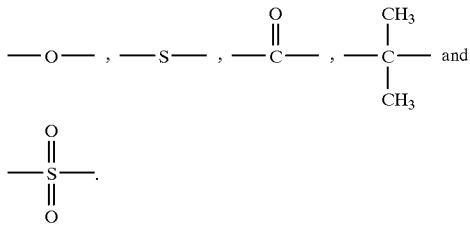

(XIII)

when polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3- aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyetherimide resin falling within the scope of Formula (I) is one comprising repeating units wherein R is paraphenylene, metaphenylene, or mixtures of paraphenylene and metaphenylene and T is a group of the formula —O—Z—O— wherein Z has the formula (XIV):

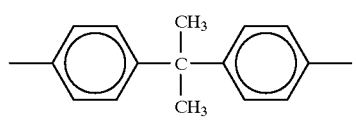

(XIV)

and wherein the divalent group (XIV) bridges the 3,3' positions of the aryl rings of the respective aryl imide moieties of formula (I).

Generally, useful polyetherimide resins have an intrinsic viscosity [ρ] greater than about 0.2 deciliters per gram, preferably of from about 0.35 to about 0.7 deciliters per gram measured in m-cresol at 25° C.

In a preferred embodiment, the polyetherimide resin of the present invention resin has a weight average molecular weight of from 10,000 to 150,000 grams per mole ("g/mol"), as measured by gel permeation chromatography, using a polystyrene standard.

Siloxane-polyetherimide copolymers suitable for use as component (b) of the thermoplastic resin composition of the present invention are known compounds whose preparation and properties have been described, see U.S. Pat. No. 5,051,483, the disclosure of which is hereby incorporated herein by reference.

In a preferred embodiment, the siloxane-polyetherimide copolymer component of the composition of the present invention has first structural units according to one or more of formulae (I) and (VI) and second structural units according to formula one or more of formulae (XV) and (XVI):

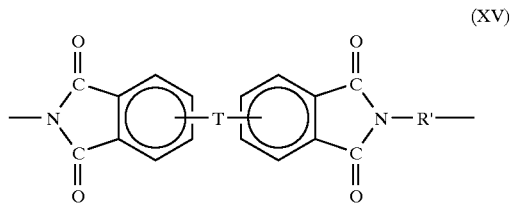

(XV)

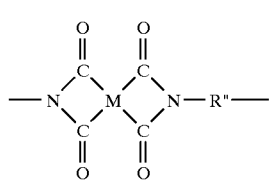

(XVI)

wherein T and M are each defined as above and R' and R" are each independently a divalent radical of the structural formula (XVII):

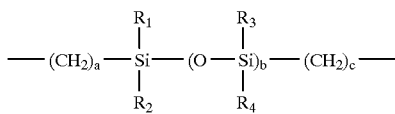

(XVII)

wherein:

R$_1$, R$_2$, R$_3$ and R$_4$ are each independently (C$_1$–C$_6$)alkyl, a and c are each independently integers from 1 to 10, preferably from 1 to 5, and b is an integer from 1 to about 40, preferably from 5 to 25.

As used herein, the term "(C$_1$–C$_6$)alkyl" means a straight or branched alkyl group of from 1 to 6 carbon atoms per group, such as, for example, methyl, ethyl, n-butyl, isobutyl, t-butyl, pentyl, hexyl.

In a preferred embodiment, the siloxane-polyetherimide copolymer is made in a manner similar to that described above for the polyetherimide resins, except that all or a portion of the diamine reactant is replaced by an aminoalkyl-terminated organosiloxane compound, preferably of the structural formula (XVIII):

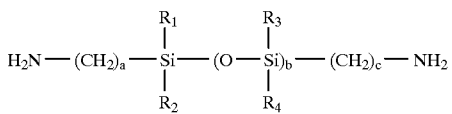

(XVIII)

wherein R$_1$, R$_2$, R$_3$, R$_4$, a, b and c are each defined as above.

In a preferred embodiment, R$_1$, R$_2$, R$_3$, R$_4$ are each methyl, a and c are each 3 and b has an average value of from 9 to 20.

In a preferred embodiment, the siloxane-polyetherimide copolymer is made by reacting an aromatic bis(ether anhydride) of the formula (X) with an organic diamine of formula (XI) and an amine-terminated organosiloxane compound of formula (XVIII). The diamine and amine-terminated organosiloxane may be physically mixed prior to reaction with the aromatic bis(ether anhydride) in order to form a random siloxane-polyetherimide copolymer, or, alternatively, the diamine and amine-terminated organosiloxane may be reacted with the aromatic bis(ether anhydride) in series in order to form an alternating copolymer or block copolymer.

In a preferred embodiment, the copolymer comprises from 50 to 80 mole % of the diamine and from 20 to 50 mole % of the amine terminated organosiloxane, based on the combined amount of diamine and amine-terminated organosiloxane.

In a preferred embodiment, the siloxane-polyetherimide copolymer has a weight average molecular weight of from 10,000 to 150,000 g/mol, as measured by gel permeation chromatography, using a polystyrene standard.

Aromatic polycarbonate resins suitable for use as component (c) of the thermoplastic resin composition of the present invention are known compounds whose preparation and properties have been described, see, generally, U.S. Pat. Nos. 3,169,121, 4,487,896 and 5,411,999, the respective disclosures of which are each incorporated herein by reference.

In a preferred embodiment, the aromatic polycarbonate resin component of the present invention is the reaction product of a dihydric phenol according to the structural formula (XIX):

HO—A—OH (XIX)

wherein A is a divalent aromatic radical, with a carbonate precursor and contains structural units according to the formula (XX):

(XX)

wherein A is defined as above.

As used herein, the term "divalent aromatic radical" includes those divalent radicals containing a single aromatic ring such as phenylene, those divalent radicals containing a condensed aromatic ring system such as, for example, naphthlene, those divalent radicals containing two or more aromatic rings joined by non-aromatic linkages, such as for example, an alkylene, alkylidene or sulfonyl group, any of which may be substituted at one or more sites on the aromatic ring with, for example, a halo group or (C$_1$–C$_6$) alkyl group.

In a preferred embodiment, A is a divalent aromatic radical according to the formula (XXI):

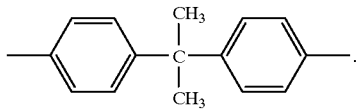

(XXI)

Suitable dihydric phenols include, for example, one or more of 2,2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 3,5,3',5'-tetrachloro-4,4'-dihydroxyphenyl) propane, 2,6-dihydroxy naphthalene, hydroquinone, 2,4'-dihydroxyphenyl sulfone. In a highly preferred embodiment, the dihydric phenol is bisphenol A.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include, for example, bishaloformates of a dihydric phenols, such as, for example, hydroquinone, or glycols, such as, for example, ethylene glycol, neopentyl glycol. In a highly preferred embodiment, the carbonate precursor is carbonyl chloride.

Suitable aromatic polycarbonate resins include linear aromatic polycarbonate resins, branched aromatic polycarbonate resins. Suitable linear aromatic polycarbonates resins include, e.g., bisphenol A polycarbonate resin. Suitable branched polycarbonates are known and are made by reacting a polyfunctional aromatic compound with a dihydric phenol and a carbonate precursor to form a branched polymer, see generally, U.S. Pat. Nos. 3,544,514, 3,635,895 and 4,001,184, the respective disclosures of which are incorporated herein by reference. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,- trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenone-tetracarboxylic dianhydride. The preferred polyfunctional aromatic compounds are 1,1,1-tri(4-hydroxyphenyl)ethane, trimellitic anhydride or trimellitic acid or their haloformate derivatives.

In a preferred embodiment, the polycarbonate resin component of the present invention is a linear polycarbonate resin derived from bisphenol A and phosgene.

In a preferred embodiment, the weight average molecular weight of the polycarbonate resin is from about 10,000 to about 200,000 g/mol, as determined by gel permeation chromatography relative to polystyrene. Such resin typically exhibits an intrinsic viscosity of about 0.3 to about 1.5 deciliters per gram in methylene chloride at 25° C.

Polycarbonate resins are made by known methods, such as, for example, interfacial polymerization, transesterification, solution polymerization or melt polymerization.

Copolyester-carbonate resins suitable for use as component (c) of the thermoplastic resin composition of the present invention are known compounds whose preparation and properties have been described, see, generally, U.S. Pat. Nos. 3,169,121, 4,430,484 and 4,487,896, the respective disclosures of which are each incorporated herein by reference.

Copolyester-carbonate resins comprise linear or randomly branched polymers that contain recurring carbonate groups, carboxylate groups and aromatic carbocyclic groups in the polymer chain, in which at least some of the carbonate groups are bonded directly to the ring carbon atoms of the aromatic carbocyclic groups.

In a preferred embodiment, the copolyester-carbonate resin component of the present invention is derived from a carbonate precursor, at least one dihydric phenol and at least one dicarboxylic acid or dicarboxylic acid equivalent. In a preferred embodiment, the dicarboxylic acid is one according to the formula (XXII):

(XXII)

wherein A' is alkylene, alkylidene, cycloaliphatic or aromatic and is preferably a non-substituted phenylene radical or a substituted phenylene radical that is substituted at one or more sites on the aromatic ring, wherein each of such substituent groups is independently ($C_1$–$C_6$) alkyl, and the copolyester carbonate resin comprises first structural units according to formula (XX) above and second structural units according to formula (XXIII):

(XXIII)
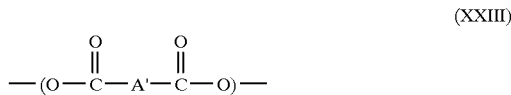

wherein A' is defined as above.

Suitable carbonate precursors and dihydric phenols are those disclosed above.

Suitable dicarboxylic acids, include, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid, cis-1,4-cyclohexane dicarboxylic acid, trans-1,4-cyclohexane dicarboxylic acid, 4,4'-bisbenzoic acid, naphthalene-2,6-dicarboxylic acid. Suitable dicarboxylic acid equivalents include, for example, anhydride, ester or halide derivatives of the above disclosed dicarboxylic acids, such as, for example, phthalic anhydride, dimethyl terephthalate, succinyl chloride.

In a preferred embodiment, the dicarboxylic acid is an aromatic dicarboxylic acid, more preferably one or more of terephthalic acid and isophthalic acid.

In a preferred embodiment, the ratio of ester bonds to carbonate bonds present in the copolyester carbonate resin is from 0.25 to 0.9 ester bonds per carbonate bond.

In a preferred embodiment, the copolyester-carbonate copolymer has a weight average molecular weight of from about 10,000 to about 200,000 g/mol.

Copolyester-carbonate resins are made by known methods, such as, for example, interfacial polymerization, transesterification, solution polymerization or melt polymerization.

Siloxane-polycarbonate copolymers suitable for use as component (d) of the thermoplastic resin composition of the present invention are known compounds whose preparation and properties have been described, see generally, U.S. Pat. Nos. 3,189,662, 3,419,632, 5,530,083 and 5,455,310 the respective disclosures of which are each incorporated herein by reference.

In a preferred embodiment, the siloxane-polycarbonate copolymer of the composition of the present invention comprises first structural units according to formula (XX) and second structural units according to the formula (XXIV):

(XXIV)
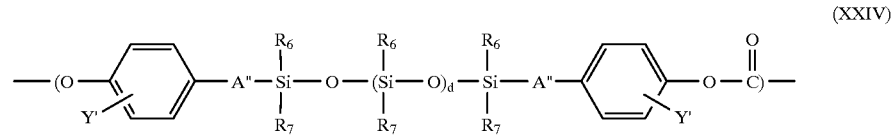

wherein:

each A" is independently $(C_2-C_{12})$alkylene;

each Y' is independently H, $(C_1-C_6)$alkyl or $(C_1-C_6)$ alkoxyl, and each $R_6$ and $R_7$ is independently H or $(C_1-C_6)$alkyl, and d is an integer from 10 to 120.

In a preferred embodiment, each A" is propylene. In a preferred embodiment, each Y' is methoxyl. In a preferred embodiment, $R_6$ and $R_7$ are each methyl. In a preferred embodiment, d is an integer from 10 to 70.

The siloxane-polycarbonate copolymer used in the composition of the present invention is made in a manner similar to that described above for the polycarbonate resins, except that all or a portion of the dihydric phenol reactant is replaced by an organosiloxane compound having reactive end groups, preferably of the structural formula (XXV):

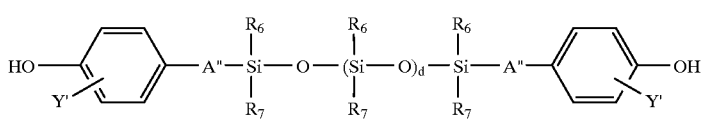

(XXV)

wherein A", $R_6$, $R_7$, d and Y' are each defined as above.

In a preferred embodiment, the organosiloxane compound (XXV) is a eugenol endcapped polydimethylsiloxane. A suitable eugenol endcapped polydimethylsiloxane is made for example, by the method disclosed in the above-referenced U.S. Pat. Number 5,455,310.

In a preferred embodiment, the relative amount of siloxane-polycarbonate copolymer first structural units according to formula (XX) and second structural units according to the formula (XXIV) are selected to provide a copolymer having a siloxane content of from 5 to 50 wt %.

In a preferred embodiment, the siloxane-polycarbonate copolymer of the present invention has a weight average molecular weight of from about 10,000 to about 100,000 g/mol.

Siloxane-polycarbonate copolymers are made by known methods, such as, for example, interfacial polymerization or melt polymerization.

Suitable glycidyl ester impact modifiers are polymers that comprise repeating units derived from one or more glycidyl ester monomers. As used herein, the terminology "glycidyl ester monomer" means a glycidyl ester of an ethylenically unsaturated carboxylic acid such as, e.g., acrylic acid, methacrylic acid, itaconic acid, and includes, e.g., glycidyl acrylate, glycidyl methacrylate, glycidyl itaconate. In a preferred embodiment, the glycidyl ester monomer is glycidyl acrylate or glycidyl methacrylate.

In a preferred embodiment, the glycidyl ester impact modifier comprises first repeating units derived one or more glycidyl ester monomers and second repeating units derived from one or more α-olefin monomers, e.g., ethylene, propylene, 1-butene, 1-pentene.

Suitable glycidyl ester copolymers may, optionally, contain a minor amount, that is, up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and $(C_1-C_{20})$alkyl (meth)acrylates such as, e.g., butyl acrylate, methyl methacrylate, cyclohexyl methacrylate. As used herein, the term "$(C_1-C_{20})$alkyl" means a straight or branched alkyl group of from 1 to 20 carbon atoms per group, such as e.g., methyl, ethyl, decyl, eicosyl, and the term "(meth)acrylate" refers collectively to acrylate compounds and methacrylate compounds.

In a preferred embodiment, the glycidyl ester impact modifier comprises from 0.5 to 40 wt %, preferably from 1 to 30 wt %, and more preferably from 2 to 20 wt %, of units derived from the glycidyl ester monomer.

In a preferred embodiment, the glycidyl ester impact modifier is a random copolymer having a relative composition according to structural formula (XXVI):

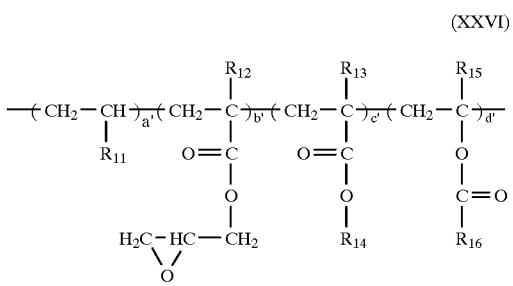

(XXVI)

wherein:

$R_{11}$ is H, alkyl, cycloalkyl or aryl;

$R_{12}$, $R_{13}$ and $R_{14}$ are each independently H or $(C_1-C_6)$ alkyl;

$R_{15}$ and $R_{16}$ are each independently alkyl or aryl;

a'+b'+c'+d'=100;

a' is from 50 to 99.5;

b' is from 0.5 to 25;

c' is from 0 to 50; and d' is from 0 to 50.

In a more highly preferred embodiment, $R_{11}$ is H, $(C_1-C_{20})$alkyl, $(C_5-C_{20})$cycloalkyl or $(C_6-C_{20})$aryl. As used herein, the term "$(C_5-C_{20})$cycloalkyl" means a cyclic alkyl group of from 5 to 20 carbon atoms per group such as e.g., cyclohexyl, cyclooctyl, and the term "$(C_6-C_{20})$aryl" means a hydrocarbon group that includes one or more unsaturated six-membered carbon rings, and may, optionally, be substituted with one or more alkyl groups on one or more of the aromatic rings, to form a substituent group having from 6 to 20 carbon atoms per group, such as, e.g., phenyl, naphthyl, tolyl, xylyl, mesityl, isopropyl phenyl.

In a more highly preferred embodiment, $R_{12}$, $R_{13}$ and $R_{15}$ are each independently H or methyl.

In a more highly preferred embodiment, $R_{14}$ and $R_{16}$ are each independently, $(C_1-C_{20})$alkyl, $(C_5-C_{20})$cycloalkyl or $(C_6-C_{20})$aryl.

In a more highly preferred embodiment, $R_{11}$ and $R_{14}$ are each methyl, $R_{12}$ and $R_{13}$ are each hydrogen, a' is from 45 to 75, b' is from 5 to 15, c' is from 20 to 40 and d' is 0.

In a preferred embodiment, the melt index, as measured at 190° C. according to ASTM D-1238, of the glycidyl ester impact modifier is from 0.1 to 100 grams/10 minutes and preferably from 0.5 to 30 grams/10 minutes.

In a preferred embodiment, the glycidyl ester impact modifier is an olefin-glycidyl (meth)acrylate copolymer, an olefin-vinyl acetate-glycidyl (meth)acrylate copolymer or an olefin-glycidyl (meth)acrylate-alkyl (meth)acrylate copolymer.

Suitable glycidyl ester copolymers can be made by, e.g., conventional free radical initiated copolymerization or graft polymerization methods.

In a highly preferred embodiment, the glycidyl ester impact modifier is used in combination with a mineral filler, a metal salt or a mixture thereof. The mineral filler, metal salt or mixture thereof is used in an amount that is effective to improve the ductility of a glycidyl ester impact modifier-containing embodiment of the thermoplastic composition of the present invention. In a preferred embodiment, the mineral filler, metal salt or mixture thereof is used in an amount of 0.05 to 5 pbw, more preferably 0.1 to 2.0 pbw, more preferably 0.5 to 1.5 pbw, based on 100 pbw of the thermoplastic resin composition of the present invention.

Suitable mineral fillers, include, for example, silica, metal oxides such as $TiO_2$ and ZnO, metal sulfides, such as, for example, ZnS, as well as clays, talcs and micas. In a preferred embodiment, the mineral filler has an average particle size of less than about 45 microns, preferably less than about 25 microns and more preferably less than about 15 microns.

Suitable metal salts are salts of a metal, such as, for example, aluminum, barium, beryllium, calcium, cobalt, copper, iron, lithium, magnesium, potassium, sodium, and zinc, with an organic acid, such as, for example, saturated and unsaturated aliphatic carboxylic acids, aromatic carboxylic acids, aliphatic and aromatic sulphonic or phosphonic acids or an inorganic acid, such as for example, HCl, $H_2SO_4$. Preferred metal salts include zinc stearate.

In a preferred embodiment, the thermoplastic resin composition of the present invention contains from 0.5 to 12 pbw of a glycidyl ester impact modifier and from 0.05 to 5 pbw $TiO_2$ each based on 100 pbw of the thermoplastic resin composition.

The thermoplastic resin composition of the present invention may, optionally, also contain various additives which are well known in the art, such as antioxidants, such as, for example, organophosphites, for example, tris(nonyl-phenyl) phosphite, 2,4-di(-tert(butylphenyl) phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetra-cis(methylene)-3,5-di-t-butyl-4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with mono-hydric or polyhydric alcohols, esters of beta-(5-tert-butyl-4-hydroxy-3-methylphenyl)-propionic acid with monoahydric or polyhydric alcohols, esters of beta-(5-tert-butyl-4-hydroxy-3-methylphenyl) propionic acid with mono-or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenol)-propionic acid; fillers and reinforcing agents, such as, for example, silicates, $TiO_2$, glass fibers, carbon black, graphite, calcium carbonate, talc, mica and other additives such as, for example, UV absorbers, light stabilizers, lubricants, plasticizers, pigments, dyes, colorants, anti-static agents, blowing agents.

The preparation of the compositions of the present invention is normally achieved by combining and mixing the components of the present invention under conditions suitable for the formation of blend of the components. Such conditions include, for example, solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The composition of the present invention can be molded into useful shaped articles, such as, for example, heat resistant containers, by a variety of means such as, for example, injection molding or extrusion.

EXAMPLES

The respective thermoplastic resin compositions of Comparative Examples C1–C7 and Examples 1–9 of the present invention were each made by combining the components described below in the relative amounts (each expressed in percent by weight, based on the total weight of the respective thermoplastic resin composition) set forth in TABLES I–IV. The components used in the thermoplastic resin compositions were as follows:

PEI-1: Polyetherimide resin made by condensation of 2,2-bis(2,3-dicarboxy phenoxy phenol)propane dianhydride with metaphenylene diamine and having a weight average molecular weight of about $55 \times 10^3$ g/mol.

PEI-2: Polyetherimide resin made by condensation of 2,2-bis(2,3-dicarboxy phenoxy phenol)propane dianhydride with metaphenylene diamine and having a weight average molecular weight of about $40 \times 10^3$ g/mol.

PC: Polycarbonate resin derived from bisphenol-A and phosgene and having a weight average molecular weight of about $36.5 \times 10^3$ g/mol.

PCE: Polyester-carbonate resin derived from bisphenol-A, having about 60% combined ester units relative to carbonate units, which were derived from about a 1:1 ratio of isophthalic acid to terephthalic acid and having a weight average molecular weight of about $35 \times 10^3$ g/mol.

Si-PEI: Siloxane/polyetherimide copolymer made by condensation of 2,2-bis(2,3-dicarboxy phenoxy phenol) propane dianhydride with metaphenylene diamine and an aminopropyl-terminated $D_{10}$ polydimethylsiloxane, containing 34 wt % of structural units derived from the polydimethylsiloxane and having a weight average molecular weight of about $60 \times 10^3$ g/mol.

SI-PC: Siloxane-polycarbonate copolymer derived from bisphenol A, phosgene and about 36 wt % of the reaction product of a eugenol-endcapped $D_{50}$ polydimethylsiloxane and having a weight average molecular weight of about $54 \times 10^3$ g/mol.

GEIM: Poly(ethylene/glycidyl methacrylate) impact modifier containing 88 wt % ethylene units and 12 wt % glycidyl methacrylate units and having a melt flow rate of 3 grams per 10 minutes at 190° C. using a 2.16 kilogram weight, (Bondfast E, Sumitomo Chemical Company).

$TiO_2$: Titanium dioxide (SCM Glidden Company).

In a series of runs, the components were blended in a twin screw extruder at a temperature of about 320° C. to about 340° C. to form the respective compositions of Examples 1–9 and Comparative Examples C1–C7. The compositions were then extruded into strands, chopped into pellets and then injection molded to form test specimens for physical property testing.

Dart impact strength was measured according to ASTM D3763 (using 4 inch diameter by 0.125 inch disks) at various temperatures, as indicated below in TABLES I–III. Notched Izod impact strength was measured, using a sample size of 2.5 inch by 0.5 inch by 0.125 inch, according to ASTM D256. Heat distortion temperature was measured at 264 pounds per square inch ("psi") on unannealed 0.25 inch thick test specimens according to ASTM D648.

Results of the testing are set forth below for each of the Comparative Examples C1–C7 and Examples 1–9 in TABLES I–IV as follows: heat distortion temperature, expressed in degrees centigrade ("HDT, ° C."), notched Izod impact strength, expressed in foot-pounds per inch ("ft-lb/in"), dart impact, expressed in foot-pounds ("ft-lb") and noting the percentage of specimens that exhibited a ductile fracture mode ("% ductile").

TABLE I

|  | CEx#C1 | Ex#1 | CEx#C2 | Ex#2 |
| --- | --- | --- | --- | --- |
| PEI-1 | 52 | 50 | 52 | 50 |
| PEI-2 | 13 | 12 | 13 | 11 |
| PC | — | — | 29 | 29 |
| FCE | 29 | 28 | — | — |
| Si—PEI | — | 4 | — | — |
| $TiO_2$ | 1 | 1 | 1 | 1 |
| GEIM Properties | 5 | 5 | 5 | 5 |
| Dart Impact, 25° C. (ft-lb/% ductile) | 34/60 | 44/100 | 41/100 | 46/100 |
| Dart Impact, 0° C. (ft-lb/% ductile) | 35/0 | 21/0 | 42/20 | 51/100 |
| Dart Impact, −20° C. (ft-lb/% ductile) | — | — | — | 51/0 |
| Dart Impact, −30° C. (ft-lb/% ductile) | — | — | — | 51/0 |
| Notched Izod Impact (ft-lb/in) | 4.6 | 3.7 | 3.6 | 5.9 |
| HDT (°C.) | 193 | 192 | 181 | 180 |

The composition of Comparative Example C1 is analogous to that of Example 1, except that the composition of Comparative Example C1 lacks the siloxane-polyetherimide copolymer component of the composition of Example 1 The composition of Example 1 exhibited improved dart impact performance at 25° C., compared to that of Comparative Example C1.

The composition of Comparative Example C2 is analogous to that of Example 2, except that Comparative Example C2 lacks the siloxane-polyetherimide copolymer component of the composition of Example 2. The compositions of Example 2 exhibited improved dart impact performance at 25° C. and at 0° C. as well as improved notched Izod impact performance, compared to that of Comparative Example C2.

TABLE II

|  | CEx#C3 | Ex#3 | Ex#4 | Ex#5 |
| --- | --- | --- | --- | --- |
| PEI-1 | 52 | 50 | 50 | 48 |
| PEI-2 | 13 | 11 | 11 | 9 |
| FC | 29 | 29 | 29 | 29 |
| Si—PEI | — | 4 | — | 4 |
| Si—PC | — | — | 4 | 4 |
| $TiO_2$ | 1 | 1 | 1 | 1 |
| GEIM Properties | 5 | 5 | 5 | 5 |
| Dart Impact, 25° C. (ft-lb/% ductile) | 41/100 | 46/100 | 36/100 | 33/100 |
| Dart Impact, 0° C. (ft-lb/% ductile) | 42/20 | 51/100 | 35/20 | 36/100 |
| Dart Impact, −20° C. (ft-lb/% ductile) | — | 51/0 | 30/0 | 39/40 |
| Dart Impact, −30° C. (ft-lb/% ductile) | — | 51/0 | 28/0 | 42/0 |
| Notched Izod Impact (ft-lb/in) | 3.6 | 5.9 | 4.7 | 5.3 |
| HDT (°C.) | 181 | 180 | 175 | 170 |

The composition of Example C3 is analogous to those of Examples 3, 4 and 5, except that the composition of Comparative Example C3 lacks the siloxane polyetherimide copolymer component of the compositions of Examples 3 and 5 and lacks the siloxane-polycarbonate copolymer component of the compositions of Examples 4 and 5. The compositions of Example 3, 4 and 5 each exhibited improved dart impact performance at 25° C. and at 0° C. as well as improved notched Izod impact performance, compared to that of Comparative Example C3.

TABLE III

|  | CEx#C4 | CEx#C5 | Ex#6 | Ex#7 |
| --- | --- | --- | --- | --- |
| PEI-1 | 74 | 72 | 70 | 68 |
| PCE | 20 | 20 | 20 | 20 |
| Si—PEI | 6 | 8 | 6 | 8 |
| Si—PC | — | — | 4 | 4 |
| Properties |  |  |  |  |
| Dart Impact, 25° C. (ft-lb/% ductile) | 37.1/80 | 49.5/100 | 46.1/100 | 45.3/100 |
| Dart Impact, 0° C. (ft-lb/% ductile) | 54.5/100 | 54/40 | — | — |
| Dart Impact, −30° C. (ft-lb/% ductile) | 32.6/0 | 37.9/20 | 53.6/100 | 55.6/100 |
| Notched Izod Impact (ft-lb/in) | 1.5 | 1.3 | 3 | 2 |
| HDT (°C.) | 193 | 186 | 192 | 189 |

The composition of Comparative Example C4 is analogous to that of Example 6, except that the composition of Comparative Example C4 lacks the siloxane-polycarbonate component of the composition of Example 6. The composition of Example 6 exhibited improved dart impact performance at 25° C. and at −30° C. as well as improved notched Izod impact performance, compared to that of Comparative Example C4.

The composition of Comparative example C5 is analogous to that of Example 7, except that the composition of Comparative Example C5 lacks the siloxane-polycarbonate component of the composition of Example 7. The composition of Example 7 exhibited improved dart impact performance at 25° C. and at −30° C. as well as improved notched Izod impact performance, compared to that of Comparative Example C5.

TABLE IV

|  | CEx#C6 | CEx#C7 | Ex#8 | Ex#9 |
|---|---|---|---|---|
| PEI-1 | 34 | 32 | 30 | 28 |
| PCE | 60 | 60 | 60 | 60 |
| Si—PEI | 6 | 8 | 6 | 8 |
| Si—PC | — | — | 4 | 4 |
| Properties |  |  |  |  |
| Dart Impact, 25° C. (ft-lb/% ductile) | 43.0/100 | 44.5/100 | 37.1/100 | 33.0/100 |
| Dart Impact, 0° C. (ft-lb/% ductile) | 52.2/100 | 55.5/100 | 40.8/100 | 44.6/100 |
| Dart Impact, −30° C. (ft-lb/% ductile) | 54.3/60 | 51.3/20 | 35.4/100 | 29.1/0 |
| Notched Izod Impact (ft-lb/in) | 2.1 | 2.1 | 3 | 3.5 |
| HDT(°C.) | 174 | 171 | 169 | 169 |

The composition of Comparative Example C6 is analogous to that of Example 8, except that the composition of Comparative Example C6 lacks the siloxane-polycarbonate component of the composition of Example 8. The composition of Example 8 exhibits improved notched Izod impact performance compared to that of Comparative Example C6.

The composition of Comparative example C7 is analogous to that of Example 9, except that the composition of Comparative Example C7 lacks the siloxane-polycarbonate component of the composition of Example 9. The composition of Example 9 exhibits improved notched Izod impact performance compared to that of Comparative Example C7.

The thermoplastic resin composition of the present invention exhibits high heat distortion temperature, good room temperature impact performance and improved impact strength and ductility at low temperatures.

We claim:

1. A thermoplastic resin composition, comprising:
   (a) a polyetherimide resin;
   (b) a siloxane-polyetherimide copolymer; and
   (c) one or more resins selected from the group consisting of polycarbonate resins and copolyester-carbonate resins; and
   (d) one or more components selected from glycidyl ester impact modifiers and siloxane-polycarbonate copolymers, in an amount effective to provide improved low temperature impact properties to the thermoplastic composition; wherein said amount effective to provide improved low temperature impact properties is from 0.5 to 12 parts by weight of the glycidyl ester impact modifiers and siloxane-polycarbonate copolymers based on 100 parts by weight of the thermoplastic resin composition.

2. The composition of claim 1, wherein the composition comprises, based on 100 parts by weight of the thermoplastic resin composition, from 50 to 80 parts by weight of the polyetherimide resin, from 0.5 to 12 parts by weight of the siloxane-polyetherimide copolymer; from 15 to 35 parts by weight of the one or more resins selected from the group consisting of polycarbonate resins and copolyester-carbonate resins and from 0.5 to 12 parts by weight of the one or more resins selected from the group consisting of glycidyl ester impact modifiers and siloxane-polycarbonate copolymers.

3. The composition of claim 1, wherein component (c) comprises a polycarbonate resin.

4. The composition of claim 3, wherein component (d) comprises a glycidyl ester impact modifier.

5. The composition of claim 3, wherein component (d) comprises a glycidyl ester impact modifier and a siloxane-polycarbonate copolymer.

6. The composition of claim 1, wherein component (c) comprises a copolyester-carbonate resin.

7. The composition of claim 6, wherein component (d) comprises a siloxane-polycarbonate copolymer.

8. The composition of claim 6, wherein component (d) comprises a glycidyl ester impact modifier.

9. The composition of claim 1, wherein component (d) comprises a glycidyl ester impact modifier and the composition further comprises, based on 100 pbw of the thermoplastic resin composition, from 0.05 to 5 pbw $TiO_2$.

10. The composition of claim 1, wherein the polyetherimide resin comprises structural units of the formula (I):

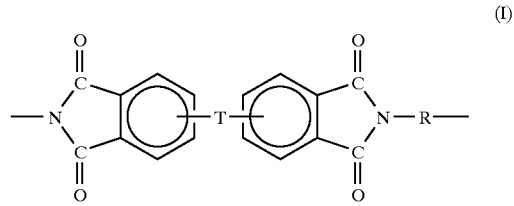

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

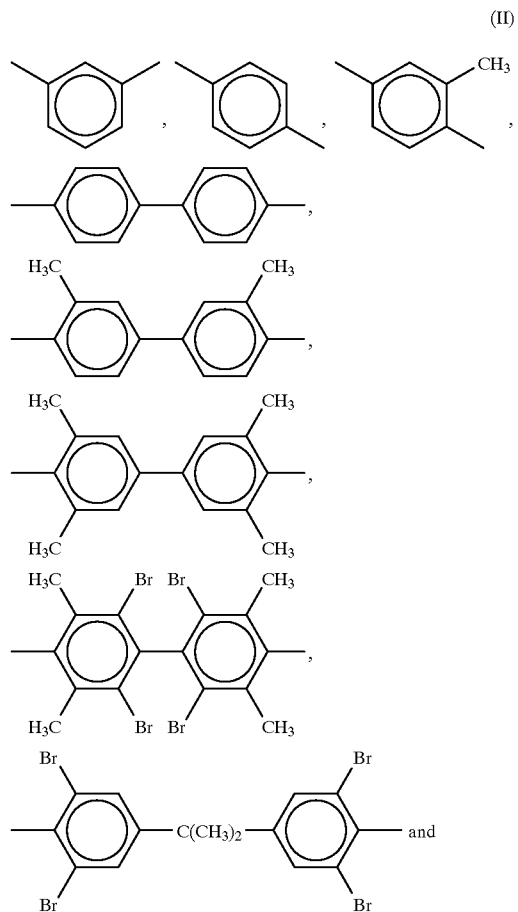

-continued

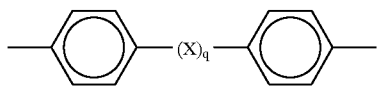

wherein X is a member selected from the group consisting of divalent radicals of the formulae (III):

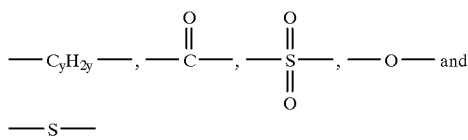

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

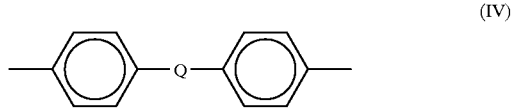

where Q is a member selected from the group consisting of formulae (V):

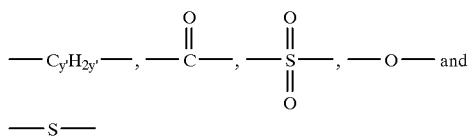

where y' is an integer from about 1 to about 5.

11. The composition of claim 1, wherein the polyetherimide resin is the reaction product formed by melt polymerization of 2,2-bis[4-(3,4-dicarboxyphenoxy)phenyl]propane dianhydride with metaphenylene diamine.

12. The composition of claim 1, wherein the siloxane-polyetherimide copolymer is the reaction product of an aromatic bis(ether anhydride) with an organic diamine and an aminoalkyl-terminated organosiloxane of the structural formula:

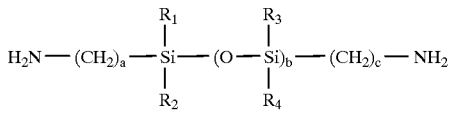

wherein:

$R_1$, $R_2$, $R_3$ and $R_4$ are each independently $(C_1-C_6)$alkyl, a and c are each independently integers from 1 to 10, and b is an integer from 1 to about 40.

13. The composition of claim 12, wherein $R_1$, $R_2$, $R_3$ and $R_4$ are each methyl, a and c are each 3 and b has an average value of from 9 to 20.

14. The composition of claim 1, wherein the aromatic polycarbonate resin is the reaction product of bisphenol A and phosgene.

15. The composition of claim 1, wherein the copolyester-carbonate resin is the reaction product of bisphenol A, phosgene and one or more of terephthalic acid and isophthalic acid.

16. The composition of claim 1, wherein the siloxane-polycarbonate comprises first structural units according to the formula:

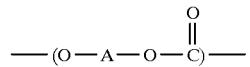

wherein A is a divalent aromatic radical, and second structural units according to the structural formula:

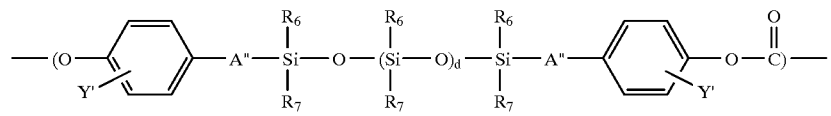

wherein each A" is independently $(C_2-C_{12})$alkylene, preferably each A" is propylene; each Y' is independently H, $(C_1-C_6)$alkyl or $(C_1-C_6)$alkoxyl, each $R_6$ and $R_7$ is independently H or $(C_1-C_6)$alkyl, and d is an integer from 10 to 120.

17. The composition of claim 16, wherein each A" is propylene, each Y' is methoxy, $R_6$ and $R_7$ are each methyl and d is from 10 to 70.

18. The composition of claim 1, wherein the glycidyl ester impact modifier is a random copolymer having a relative composition according to structural formula:

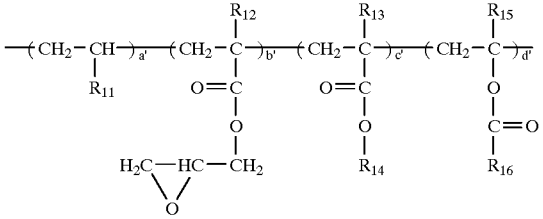

wherein:

$R_{11}$ is H, alkyl or aryl;

$R_{12}$, $R_{13}$ and $R_{14}$ are each independently H or $(C_1-C_6)$ alkyl;

$R_{15}$ and $R_{16}$ are each independently alkyl or aryl;

a'+b'+c'+d'=100;

a' is from 50 to 99.5;

b' is from 0.5 to 25;

c' is from 0 to 50; and d' is from 0 to 50.

19. The composition of claim 18, wherein $R_{11}$ and $R_{12}$ are each methyl, $R_{13}$ and $R_{14}$ are each H, a' is 45 to 75, b' is 5 to 15, c' is 20 to 40 and d' is 0.

20. A thermoplastic resin composition, comprising the composition obtained by blending:

(a) a polyetherimide resin;

(b) a siloxane-polyetherimide copolymer; and (c) one or more resins selected from the group consisting of polycarbonate resins and copolyester-carbonate resins; and (d) one or more component selected from glycidyl ester impact modifiers and siloxane-polycarbonate copolymers, in an amount effective to provide improved low temperature impact properties to the thermoplastic composition.

21. A shaped article molded from a thermoplastic resin composition, comprising:

(a) a polyetherimide resin;

(b) a siloxane-polyetherimide copolymer; and (c) one or more resins selected from the group consisting of polycarbonate resins and copolyester-carbonate resins; and (d) one or more components selected from glycidyl ester impact modifiers and siloxane-polycarbonate copolymers, in an amount effective to provide improved low temperature impact properties to the thermoplastic composition; wherein said amount effective to provide improved low temperature impact properties is from 0.5 to 12 parts by weight of the glycidyl ester impact modifiers and siloxane-polycarbonate copolymers based on 100 parts by weight of the thermoplastic resin composition.

* * * * *